(12) United States Patent
Marten

(10) Patent No.: US 9,325,503 B2
(45) Date of Patent: Apr. 26, 2016

(54) METHODS AND SYSTEMS FOR USER AUTHENTICATION

(71) Applicant: ECHOSTAR TECHNOLOGIES L.L.C., Englewood, CO (US)

(72) Inventor: Neil Marten, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/302,768

(22) Filed: Jun. 12, 2014

(65) Prior Publication Data

US 2015/0365234 A1  Dec. 17, 2015

(51) Int. Cl.
*G06F 21/36* (2013.01)
*H04L 9/32* (2006.01)

(52) U.S. Cl.
CPC ............. *H04L 9/3226* (2013.01); *G06F 21/36* (2013.01)

(58) Field of Classification Search
None
See application file for complete search history.

(56) References Cited

U.S. PATENT DOCUMENTS

| | | | | |
|---|---|---|---|---|
| 8,117,652 | B1* | 2/2012 | Lu | .................................. 726/18 |
| 8,931,083 | B2* | 1/2015 | Griffin et al. | .................... 726/19 |
| 2003/0210127 | A1* | 11/2003 | Anderson | ............... G06F 21/36 340/5.27 |
| 2006/0179471 | A1 | 8/2006 | Roth | |
| 2007/0198847 | A1* | 8/2007 | Watari | .......................... 713/184 |
| 2009/0328197 | A1 | 12/2009 | Newell | |
| 2011/0016520 | A1* | 1/2011 | Cohen et al. | ..................... 726/19 |
| 2011/0078788 | A1* | 3/2011 | Takimoto | ......................... 726/19 |
| 2012/0116934 | A1* | 5/2012 | Chittella | ......................... 705/34 |
| 2012/0268393 | A1* | 10/2012 | Lee | ................................ 345/173 |
| 2014/0043243 | A1* | 2/2014 | Methenitis | .................... 345/173 |
| 2014/0101744 | A1* | 4/2014 | Liu et al. | ........................... 726/7 |
| 2014/0229884 | A1* | 8/2014 | Shimazaki | .................... 715/773 |
| 2014/0359300 | A1* | 12/2014 | Shirakawa | ................... 713/183 |
| 2015/0101040 | A1* | 4/2015 | Hayashi | ......................... 726/19 |

FOREIGN PATENT DOCUMENTS

| | | |
|---|---|---|
| FR | 2880486 A1 | 7/2006 |
| JP | 2007310515 A | 11/2007 |
| WO | 2015091035 A1 | 6/2015 |

OTHER PUBLICATIONS

European Patent Office International Searching Authority, Search Report and Written Opinion for International Application No. PCT/US2015/034895 mailed Jul. 29, 2015.

* cited by examiner

*Primary Examiner* — Hadi Armouche
*Assistant Examiner* — Malcolm Cribbs
(74) *Attorney, Agent, or Firm* — Ingrassia Fisher & Lorenz, P.C.

(57) ABSTRACT

Methods and systems are provided for authenticating a user for access to restricted content. An exemplary method involves providing a plurality of selectable regions on a display, authenticating the user based at least in part on a user input that corresponds to a selectable region that includes a portion of authentication information, and providing the restricted content to the display after authenticating the user. Each selectable input region of the plurality of selectable regions includes a plurality of characters. In exemplary embodiments, the characters of one or more selectable input regions are randomized.

17 Claims, 5 Drawing Sheets

US 9,325,503 B2

METHODS AND SYSTEMS FOR USER AUTHENTICATION

TECHNICAL FIELD

Figure 1:
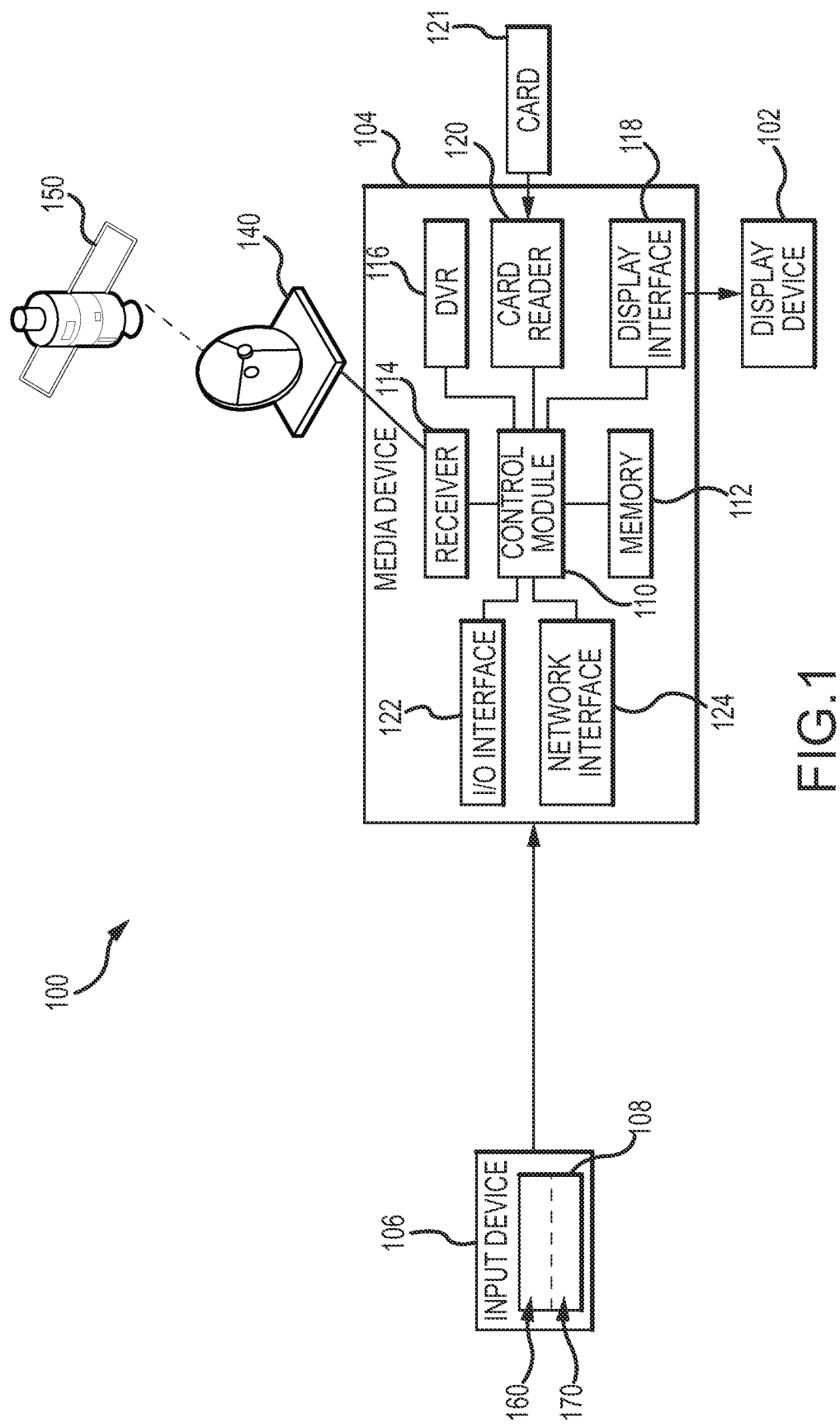

The following description generally relates to securely authenticating users using a display that is viewable by individuals other than the user being authenticated.

BACKGROUND

Passwords, passcodes, personal identification numbers (PINs), and the like are commonly used to restrict access to content, services, and/or other resources to only authenticated users qualified or otherwise authorized for such access. However, authentication information can be susceptible to unauthorized users "stealing" the authentication information by observing entry. This poses a problem when the entry of authentication information is visible on an electronic display, such as a television, a tablet computer, a touchscreen, or the like, where an unauthorized user can relatively inconspicuously observe or otherwise track the authentication information being entered. Accordingly, it is now desirable to provide systems and methods that allow authentication information to be entered in conjunction with an electronic display in a secure manner. Other desirable features and characteristics may also become apparent from the subsequent detailed description and the appended claims, taken in conjunction with the accompanying drawings and this background section.

BRIEF SUMMARY

According to various exemplary embodiments, systems, devices and methods are provided for authenticating a user for access to restricted content. One exemplary method involves providing a plurality of selectable regions on a display, where a first region of the plurality of selectable regions includes a portion of authentication information for an authorized user and each selectable input region of the plurality of selectable regions includes a plurality of characters. The method continues by authenticating the user based at least in part on a user input that corresponds to the first region including the portion of authentication information and providing the restricted content to the display after authenticating the user.

In other embodiments, an apparatus for a media device is provided. The media device includes a first interface to receive an input from a user, a second interface to a display device, and a control module coupled to the first interface and the second interface. The control module authenticates the user based at least in part on the input corresponding to a first selectable input region of a plurality of selectable input regions presented on the display device and provides restricted content to the second interface for presentation on the display device after authenticating the user. Each selectable input region of the plurality of selectable input regions includes a plurality of characters, and the first selectable input region includes a portion of authentication information associated with an authorized user.

In another embodiment, a system includes a media device coupled to a network and a server coupled to the network. The server provides a plurality of selectable input regions to a client device and provides streaming instructions for a restricted media program to the media device after authenticating the client device based at least in part on user input received from the client device that corresponds to a first selectable input region of the plurality of selectable input regions, where the first selectable input region includes a portion of authentication information associated with an authorized user. Each selectable input region of the plurality of selectable input regions includes a plurality of characters. The media device streams the restricted media program to the client device via the network in response to the streaming instructions.

Various embodiments, aspects and other features are described in more detail below.

BRIEF DESCRIPTION OF THE DRAWING FIGURES

Figure 2:
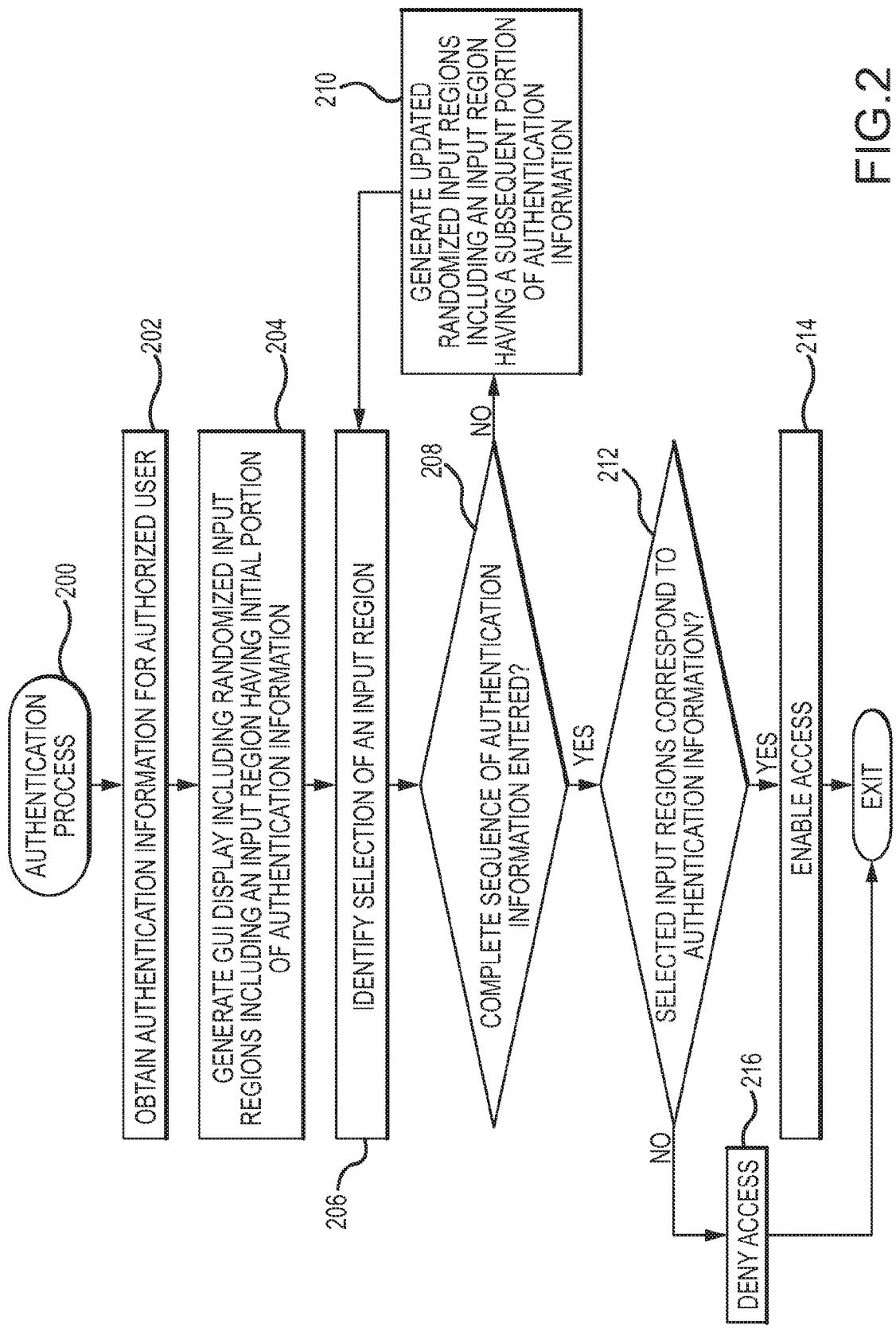
Figure 5:
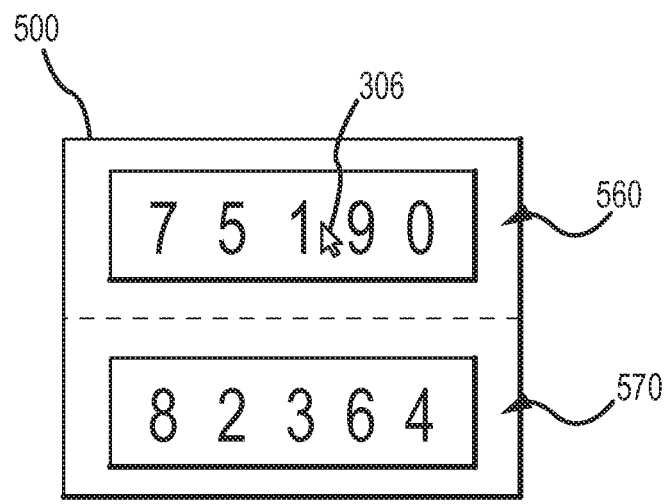
Figure 6:
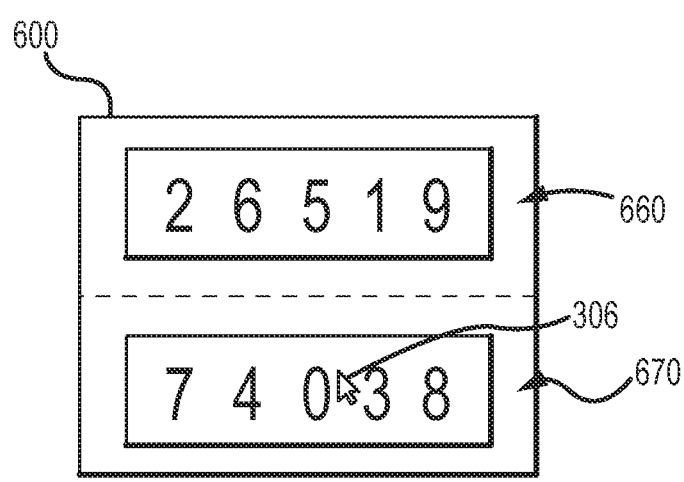
Figure 7:
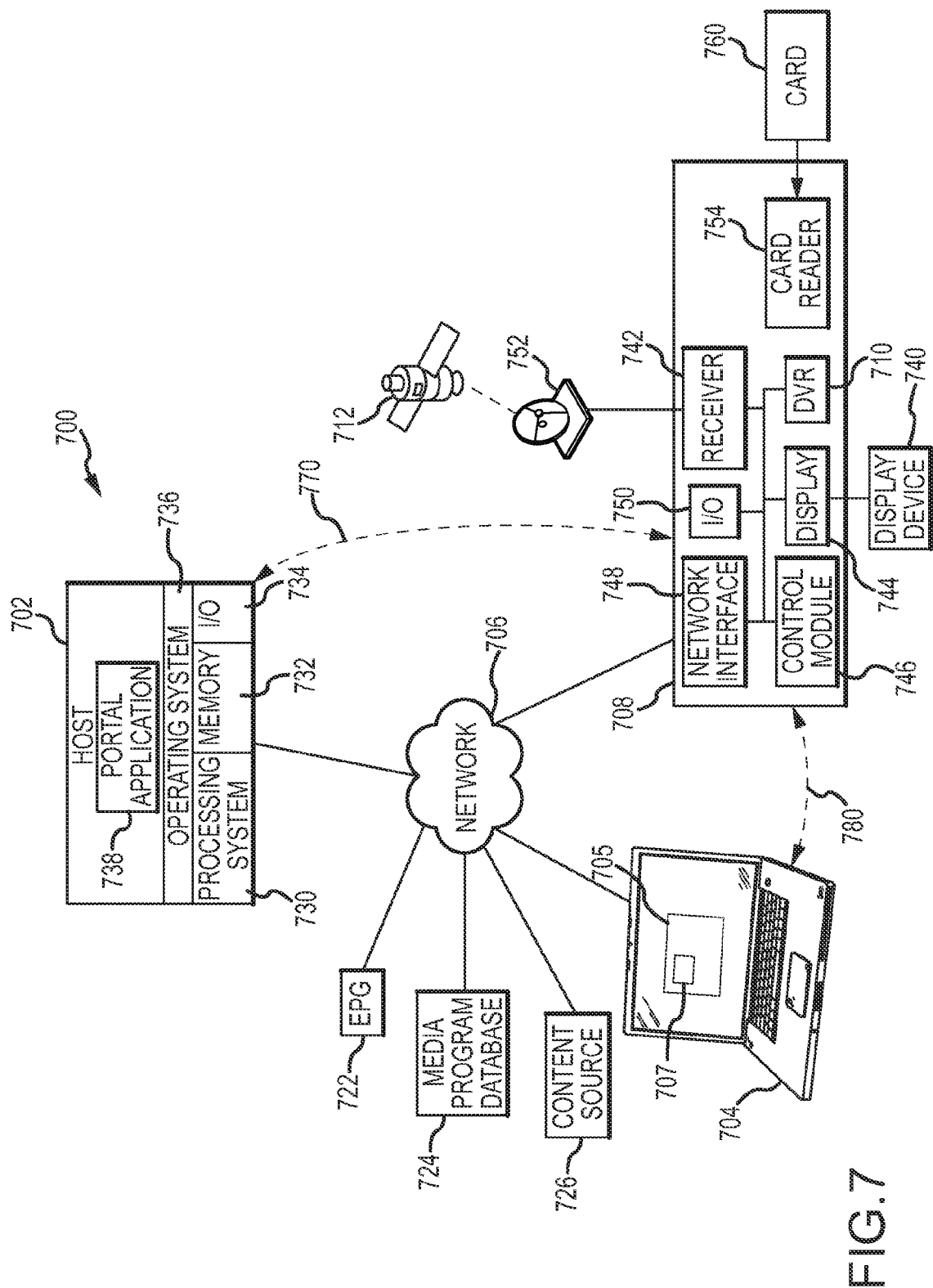

Exemplary embodiments will hereinafter be described in conjunction with the following drawing figures, wherein like numerals denote like elements, and FIG. 1 is a block diagram of a media system in accordance with one or more embodiments;

FIG. 2 is a flowchart of an exemplary authentication process suitable for use with the media system of FIG. 1 in accordance with one or more embodiments;

FIGS. 3-6 depict a sequence of graphical user interface (GUI) displays suitable for presentation on the display device within the media system of FIG. 1 in accordance with one exemplary embodiment of the authentication process of FIG. 2; and FIG. 7 is a block diagram of a system for placeshifting content from a media device to a client device suitable for implementing the authentication process of FIG. 2 in accordance with one or more embodiments.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to authenticating a user or device before enabling that user or device to access content for which access is restricted or otherwise limited, based on one or more rules, settings, or other access controls. For purposes of explanation, the subject matter may be described herein in the context of restricted media content (or a restricted media program), however, it will be appreciated that the subject matter described herein is not intended to be limited to any particular type of content being restricted and may be implemented in an equivalent manner for any type of content (e.g., web content or the like). As used herein, "media content," "media program," or variants thereof should be understood as referring to any audio, video, audio/visual or other programming in any streaming, file-based or other format. Again, for purposes of explanation, the subject matter may be described herein in the context of recorded or live broadcast media programs available at a media device for presentation on a display device coupled to the media device placeshifting to a client device (e.g., for presentation on a display associated with the client device), however, it should be appreciated that the subject matter described herein is not necessary limited to any particular type of media program or any particular type of content source.

As described in greater detail below in the context of FIGS. 2-6, in exemplary embodiments, a plurality of selectable input regions are provided to or otherwise presented on a display device, where an individual input region on the display device may be selected by a user manipulating a user input device. Each of the selectable regions includes a plurality of characters, such as alphanumeric and/or symbolic text characters, and in exemplary embodiments, the contents of the selectable regions are randomized (e.g., using a random number generator, a random character generator, or the like). At least one of the selectable regions includes a portion of authentication information to be entered for an authorized user with respect to the restricted content (e.g., a user that is allowed to access or view the restricted content). In exemplary embodiments, the contents of the selectable regions are mutually exclusive, and only one of the selectable regions includes the character(s) of the authentication information to be entered. The authentication information may be realized as an alphanumeric password, passcode, personal identification number (PIN) or another numerical code, key, or any other suitable unique authorization information, and the subject matter described herein is not limited to any particular type or length of authentication information.

In response to receiving user input indicative of a selected region on the display, the authentication process determines whether a complete sequence of authentication information has been entered. If not, the display is updated to include a plurality of updated selectable input regions that are different from the preceding selectable input regions, where one of the updated selectable regions includes a subsequent portion of authentication information to be entered. Thus, the authentication process presents a sequence of graphical user interface (GUI) displays for entering a complete sequence of authentication information, where the selectable regions of the GUI displays are updated as portions of the authentication information are entered. After a complete sequence of proffered authentication information has been entered, the authentication process verifies or otherwise confirms that the selected regions include or otherwise correspond to respective portions of the authentication information for the authorized user in the appropriate order or sequence. When the selected regions match or otherwise correspond to the authentication information for the authorized user, the authentication process enables access to the restricted content, for example, by allowing the restricted content to be provided to or otherwise presented on the display.

FIG. 1 depicts a media system 100 configured to present a media program (or media content) on a display device 102 associated with a media device 104. The media device 104 is communicatively coupled to an input device 106 that functions as a user interface enabling user interaction with the media device 104 to control, manipulate, or otherwise influence the content presented on the display device 102. As described in greater detail below in the context of FIGS. 2-6, prior to presenting a restricted media program that requires a viewer to be authenticated as an authorized user, the media device 104 generates selectable input regions on a display, where one of the regions includes a portion of authentication information for an authorized user. To input authentication information, the viewer may manipulate the input device 106 to select or otherwise indicate a particular region on the display device 102. In response to receiving or otherwise identifying user-selection of a particular region, the media device 104 may update the regions on the display such that only one of the updated regions includes a subsequent portion of the authentication information for that authorized user, and so on, until a complete sequence of proffered authentication information has been selected. Once a complete sequence of authentication information has been entered, the media device 104 authenticates the viewer as an authorized user when the sequence of selected input regions correspond to the sequential portions of the authentication information for that authorized user and enables access to the restricted media program, for example, by presenting or otherwise providing the video content corresponding to the restricted media program on the display device 102.

In exemplary embodiments, the input device 106 is realized as an electronic device that is paired or otherwise associated with the media device 104 such that the media device 104 allows the input device 106 to control its operation. In one or more embodiments, the input device 106 is realized as a remote control associated with the media device 104 that communicates with the media device 104 wirelessly in a point-to-point manner, for example, via consumer infrared (e.g., using a carrier frequency in the range of about 30 kHz to about 60 kHz), an unlicensed radio band (e.g., using a 2.4 GHz carrier frequency such as Bluetooth®), or the like. However, in other embodiments, the input device 106 may communicate with the media device 104 via a wired connection. In yet other embodiments, the input device 106 may be realized as a mobile telephone, a laptop or notebook computer, a tablet computer, a desktop computer, a personal digital assistant, a video game player, a portable media player and/or any other computing device capable of communicating with the media device 104. In this regard, in some embodiments, the input device 106 may communicate with the media device 104 via a communications network, such as a wireless local area network (WLAN), a cellular network, the Internet, or the like. That said, for purposes of explanation, the media system 100 may be described in the context of the input device 106 being realized as a remote control that communicates with the media device 104 wirelessly in a point-to-point or peer-to-peer manner in accordance with a particular communications protocol.

In exemplary embodiments, the input device 106 includes a user input element 108, such as a touch-sensing element, for receiving input from a viewer of the display device 102 that is in possession of the input device 106. In exemplary embodiments, input received by the input element 108 is replicated or otherwise presented on the display device 102. For example, a position of a GUI element on the display device 102, such as a pointer or cursor, may be correlated with the position or location of the user input on the input element 108. In accordance with one or more embodiments, the input element 108 is realized as a touchpad or touch panel that does not include a corresponding display on the input device 106. However, in alternative embodiments, the input element 108 may be realized as a touchscreen having a display device integrated therewith, where the position of a GUI element on the display device of the touchscreen tracks the position of the user input on the touchscreen. In yet other embodiments, the input element 108 may be realized as a directional pad, a keyboard or keypad, a mouse, or the like. That said, while the subject matter described herein is not necessarily limited to any particular type of input element 108, for purposes of explanation, the subject matter is described herein in the context of the input element 108 on the input device 106 being realized as a touch-sensing element.

Still referring to FIG. 1, in the illustrated embodiment, the media device 104 is any electronic device, hardware, or other component capable of receiving and processing media content and providing media content to the display device 102 for presentation on the display device 102. The display device 102 generally represents a television, monitor, liquid crystal display (LCD), light emitting diode (LED) display, plasma display, or the like that graphically presents, renders, or otherwise displays imagery and/or video corresponding to media content provided by the media device 104. In exemplary embodiments, media device 104 is a set-top box (STB) or similar system that is able to receive television programming and/or to record certain media programs. Exemplary embodiments of media device 104 will therefore include a receiver interface 114 for receiving satellite, cable and/or broadcast programming signals from broadcast content sources 150, as well as a data storage medium 116 (e.g., a hard disk, flash memory, or another suitable non-volatile data storage element) to support a digital video recorder (DVR) feature and/or functionality, and a display interface 118 for providing imagery and/or video corresponding to a media program to the display device 102. For convenience, but without limitation, the data storage medium 116 is alternatively referred to herein as a DVR. In some embodiments, the media device 104 may also include an access card interface or card reader 120 adapted to receive an access card 121 (or viewing card) configured to ensure that the viewer is authorized to view media content provided to the display device 102. In this regard, the access card 121 may include unique identification information associated with a particular subscriber to the broadcast content source 150 or otherwise include information that facilitates receiving and/or decoding media content provided by the broadcast content source 150.

The illustrated media device 104 also includes an input/output (I/O) interface 122 capable of communicating with a remote control for receiving user inputs to the media device 104. In this regard, when the input device 106 is realized as a remote control, the I/O interface 122 includes one or more receivers (e.g., an infrared receiver or the like) capable of receiving signals indicative of the user input on the touch-sensing element 108. The media device 104 may also include a network interface 124 that facilitates communications via a communications network. Depending on the embodiment, the network interface 124 may be realized as a wireless adapter, a wireless transceiver, a wireless network interface controller, a cellular transceiver, a wired network interface controller (e.g., an Ethernet adapter), or the like. In this regard, in alternative embodiments when the input device 106 is realized as a networked electronic device, the network interface 124 receives signals indicative of the user input on the touch-sensing element 108 from the input device 106 via a communications network.

It should be appreciated that FIG. 1 depicts merely one exemplary embodiment of a media device 104, and in practice, the media device 104 may be physically and/or logically implemented in any manner to suit the needs of a particular embodiment. In this regard, in some embodiments, the components in media device 104 may be provided within a common chassis or housing as illustrated in FIG. 1, although equivalent embodiments may implement media device 104 with any number of inter-connected but discrete components or systems. For example, in some embodiments, the media device 104 may be realized as a combination of a STB and a placeshifting device, wherein some features of the media device 104 (e.g., the DVR 116, the receiver 114, the display interface 118, input/output interface 122) are implemented by the STB and other features of the media device 104 (e.g., the network interface 124) are implemented by the placeshifting device, wherein the placeshifting device works in conjunction with the STB to shift the viewing experience from a home television (e.g., display device 102) to another display that is accessed via network. Examples of placeshifting devices that may be used in some embodiments of media device 104 could include any of the various SLINGBOX products available from Sling Media of Foster City, Calif., although other products or services could be used in other embodiments. Many different types of placeshifting devices are generally capable of receiving media content from an external source, such as any sort of DVR or STB, cable or satellite programming source, DVD player, content servers, and/or the like. In other embodiments, placeshifting features are incorporated within the same device that provides content-receiving or other capabilities. Media device 104 may be a hybrid DVR and/or receiver, for example, that also provides transcoding and placeshifting features.

Still referring to FIG. 1, in the illustrated embodiment, media device 104 is capable of receiving digital broadcast satellite (DBS) signals transmitted from a broadcast source 150, such as a satellite, using an antenna 140 that provides received signals to the receiver 114. Equivalent embodiments, however, could receive programming at receiver 114 from any sort of cable connection, broadcast source, removable media, network service, external device and/or the like. The DVR 116 feature stores recorded programming (e.g., broadcast programming received via receiver 114) on a hard disk drive, memory, or other storage medium as appropriate in response to user/viewer programming instructions, wherein the recorded programming may be subsequently viewed on display device 102 or placeshifted to another client device via a network. Content stored in DVR 116 may be any sort of file-based programming or other content that is accessible to media device 104. Additionally, media content in DVR 116 may be stored in any sort of compressed or uncompressed format, as desired, and may be encoded or transcoded as desired for effective receipt, storage, retrieval and playing.

Still referring to FIG. 1, the media device 104 includes a control module 110 configured to direct, manage, or otherwise control the operations of the media device 104 as appropriate. The control module 110 may be realized as any suitable combination of hardware, firmware, and/or other components of the media device 104 capable of directing, managing or otherwise controlling the operations of media device 104. The control module 110 may be realized using any suitable processing system, processing device, or combination thereof. For example, the control module 110 may include one or more processors, central processing units (CPUs), graphics processing units (GPUs), controllers, microprocessors, microcontrollers, processing cores and/or other computing resources configured to support the subject matter described herein. The media device 104 also includes a data storage element (or memory) 112 that is coupled to or otherwise accessed by the control module 110. The memory 112 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the control module 110. The stored programming instructions, when read and executed by the control module 110, cause the control module 110 to perform various tasks, functions, and/or processes to control operations of the media device 104 and support the authentication process 200 described in greater detail below in the context of FIG. 2. In some embodiments, the control module 110 is implemented as a "system on a chip" (SoC) that incorporates a hybrid microcontroller with memory, input/output and other features to perform the various processing and other functionality of media device 104, and in which case a separate memory 112 may not be provided.

In exemplary embodiments, the memory 112 of the media device 104 stores or otherwise maintains access control information corresponding to the rules or settings that define types, genres, or categories of media programs available for presentation on the display device 102 for which access is restricted. For example, parental controls may be enabled that restrict access to certain types of media programs (e.g., pay-per-view programming, or the like) or media programs having certain ratings (e.g., TV-MA or the like), such that a restricted media program will only be presented on the display device 102 upon the media device 104 receiving authentication information from the viewer via the input device 106. In this regard, the memory 112 of the media device 104 stores or otherwise maintains authentication information that enables an authorized user to bypass the access controls and view restricted content on the display device 102. For example, the authentication information may be realized as a password, a passcode, a PIN or other numerical code, a key, or some other unique authorization information. In some embodiments, the authentication information may be set or otherwise configured by a subscriber associated with the media device 104 to a user-specified alphanumeric string, code, or value. In alternative embodiments, the authentication information may be assigned to the subscriber by the broadcast content source 150, in which case, the authentication information may be stored or otherwise maintained on the access card 121 in lieu of being stored in memory 112.

In some embodiments, the memory 112 of the media device 104 also stores or otherwise maintains indication of which users (or user roles) are authorized to access and/or denied access to the particular types, genres, or categories of the restricted content. For example, multiple users may be associated with a particular subscriber account (e.g., by manipulating the input device 106 to create or otherwise define user profile information for the respective users to be added), where user identification information associated with the respective users is stored in memory 112 along with the respective authentication information associated with each respective user. Thus, for a particular type, genre, or category of media programming, the access control information may identify which users are authorized to view that respective media programming by inputting or otherwise providing their respective authentication information (e.g., the password associated with that particular user's profile).

FIG. 2 depicts an exemplary embodiment of an authentication process 200 for authenticating a viewer as an authorized user prior to presenting restricted content on a display device, such as the display device 102 in the media system 100 of FIG. 1. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the authentication process 200 may be performed by different elements of the media system 100, such as, for example, the media device 104, the input device 106, the touch-sensing element 108, the control module 110, the memory 112, DVR 116, the display interface 118, the card reader 120, the I/O interface 122, and/or the network interface 124. It should be appreciated that the authentication process 200 may include any number of additional or alternative tasks, the tasks need not be performed in the illustrated order and/or the tasks may be performed concurrently, and/or the authentication process 200 may be incorporated into a more comprehensive procedure or process having additional functionality not described in detail herein. Moreover, one or more of the tasks shown and described in the context of FIG. 2 could be omitted from a practical embodiment of the authentication process 200 as long as the intended overall functionality remains intact.

Referring to FIG. 2, and with continued reference to FIG. 1, in exemplary embodiments, the authentication process 200 is initiated by the media device 104 in response to identifying an attempt by a viewer to view or otherwise access a restricted media program from the broadcast content source 150 or the DVR 116. For example, the viewer may manipulate the input device 106 to signal the media device 104 and/or control module 110 to tune the receiver 114 to a particular broadcast channel currently airing a media program subject to access controls, or alternatively, to view a recorded media program from the DVR 116 that is subject to access controls.

In response to an attempt to access restricted content, the authentication process 200 identifies or otherwise obtains authentication information to be used to verify that the viewer is an authorized user (task 202). In embodiments where multiple different users are not supported or user profiles for multiple different users have not been created or configured, the control module 110 obtains the unique authorization information associated with the subscriber associated with the media device 104. In other embodiments where the memory 112 maintains user profiles for multiple different users, the media device 104 and/or control module 110 may generate or otherwise provide a GUI display on the display device 102 that includes one or more GUI elements prompting the viewer to input or otherwise provide, via the input device 106, his or her user identification information. In response to receiving user identification information (e.g., a user name or user identifier), the control module 110 accesses the memory 112 to obtain the authentication information associated with that particular user. It should be noted that in situations where the identified user is not authorized to view the restricted media program selected for viewing (e.g., the access control information indicates currently selected user profile cannot access the selected type of media program), the media device 104 and/or the control module 110 may automatically deny access to the restricted media program (e.g., task 216), at which point the authentication process 200 terminates or exits.

After obtaining the authentication information to be utilized for verifying the viewer is authorized with respect to the requested content, the authentication process 200 generates or otherwise provides a plurality of selectable input regions on the display device, where at least one of the selectable input regions includes an initial portion of that authentication information (task 204). In this regard, the media device 104 and/or the control module 110 generates or otherwise provides a GUI display on the display device 102 that includes multiple different regions that are selectable by the viewer using the input device 106 to input or otherwise enter at least a portion of the contents contained in the selected region. In exemplary embodiments, each selectable region of the GUI display includes a plurality of different text characters (e.g., alphanumeric characters, symbol characters, or the like). The contents of at least one selectable region includes the initial portion of the authentication information being used to authenticate the user, such as, for example, the initial text character of the authorized user's password, passcode, PIN code or other numerical code, or the like. In exemplary embodiments, the initial portion of the authentication information is presented on the GUI display in only one of the selectable regions. For example, the initial character of the authorized user's authentication information may be presented in only one selectable region on the display device 102 while being excluded or otherwise absent from the remaining selectable regions on the display device 102.

In one or more exemplary embodiments, the combination of characters within each selectable region on the display device 102 are unique with respect to the other selectable regions. In other words, the sets of text characters contained within the respective selectable regions are mutually exclusive such that no character is presented in more than one selectable region on the display device 102 at any given time. Each selectable input region is allocated or otherwise associated with a particular portion on the display device 102, such that the set of text characters associated with a respective selectable region are presented within its associated portion on the display device 102. In one or more embodiments, the portions on the display device 102 to which the selectable input regions are allocated are mutually exclusive, such that each selectable input region does not overlap any other selectable input region.

In exemplary embodiments, the selectable input regions are randomized, that is, one or more characters in the set of characters associated with a selectable input region may be determined randomly, for example, by using a random character generator. For example, to generate a first selectable input region on the display device 102, the media device 104 and/or the control module 110 may allocate or otherwise assign the initial alphanumeric character of an authorized user's alphanumeric password and use a random character generator to randomly select or otherwise identify one or more additional characters to be assigned to the first selectable input region. Thereafter, for each additional selectable input region to be presented on the display device 102 that does not include the authentication information, the media device 104 and/or the control module 110 may use the random character generator to randomly select or otherwise identify a plurality of random characters that are different from the set of characters associated with the other selectable input regions. In this regard, in embodiments where the selectable input regions, the media device 104 and/or the control module 110 may discard any characters generated by the random character generator that have already been assigned to another selectable input region.

Figure 3:
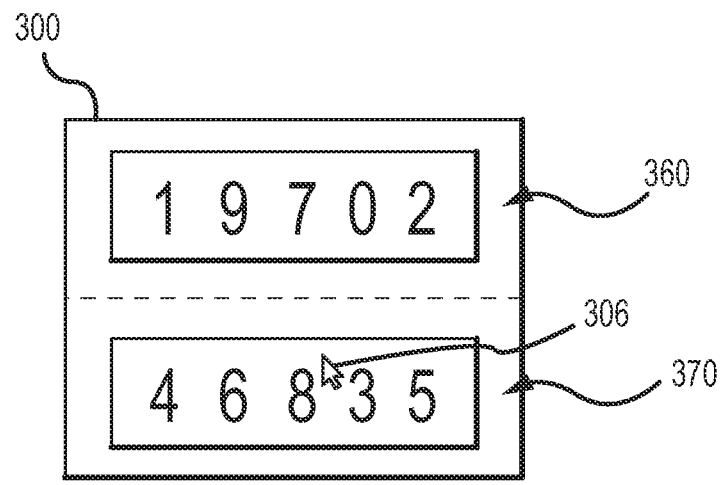

FIG. 3 depicts an exemplary authentication information input GUI display 300 that may be generated by the media device 104 and/or the control module 110 and presented on the display device 102 in conjunction with the authentication process 200 in accordance with one or more embodiments. In this regard, FIG. 3 depicts an embodiment where the authorization information is realized as a PIN code or another numerical code and the contents of the selectable input regions 360, 370 are limited to numerical characters, such as, Arabic numeral digits. However, it should be appreciated that the subject matter described herein is not limited to numerical characters being presented in the selectable regions of the authentication information input GUI display, and in alternative embodiments, the selectable regions may include any type and/or number of alphanumeric and/or symbolic text characters. Moreover, although FIG. 3 depicts the authentication information input GUI display being divided or allocated into two selectable input regions 360, 370, the subject matter described herein is not limited to dividing the authentication information input GUI display into any particular number of selectable input regions, and in alternative embodiments, the authentication information input GUI display may be divided into more than two selectable input regions.

Referring to FIG. 3 with reference to FIG. 1, in exemplary embodiments, each selectable input region 360, 370 of the authentication information input GUI display 300 corresponds to or is otherwise correlated with a respective region 160, 170 of the touch-sensing element 108. In this regard, the upper selectable input region 360 on the authentication information input GUI display 300 corresponds to the upper region (or upper portion) 160 of the touch-sensing element 108, while the lower selectable input region 370 corresponds to the lower region (or lower portion) 170 of the touch-sensing element 108. As illustrated, the selectable input regions 360, 370 are allocated to mutually exclusive portions of the GUI display 300, such that they do not overlap, and the corresponding regions 160, 170 of the touch-sensing element 108 are mutually exclusive and do not overlap.

As described above, in exemplary embodiments, the contents of the selectable input regions 360, 370 are randomly generated in a manner that ensures that at least one of the selectable input regions 360, 370 includes a digit of an authorized user's PIN code being used to authenticate the viewer. For example, the media device 104 and/or the control module 110 may implement or otherwise provide a random number generator that randomly generates a number from 0 to 9 and alternately assigns the generated number to one of the input regions 360, 370. In this manner, the media device 104 and/or the control module 110 may randomly assign or otherwise allocate each Arabic numeral (e.g., each number from 0 to 9) to one of the input regions 360, 370. In exemplary embodiments, the contents of the selectable input regions 360, 370 are mutually exclusive, such that each digit is assigned to and presented within only one of the input regions 360, 370.

Referring again to FIG. 2 with reference to FIGS. 1 and 3, in exemplary embodiments, the authentication process 200 continues by detecting or otherwise identifying selection of an input region on the display device (task 206). In this regard, the viewer manipulates the input device 106 to indicate or otherwise select which input region presented on the display device 102 includes the character(s) that the viewer would like to input as authentication information. As illustrated in FIG. 3, in exemplary embodiments, the media device 104 and/or the control module 110 generates or otherwise provides a GUI element 306, such as a pointer, overlying the GUI display 300 on the display device 102 that may be manipulated with the input device 106 to indicate or otherwise select one of the selectable regions 360, 370 on the display 300. In this regard, the position of the pointer 306 on the display 102, 300 corresponds to or is otherwise correlated with a position of an object (e.g., a finger of the viewer) that is sensed or otherwise detected by the touch-sensing element 108. For example, the location or position of the pointer 306 on the display 102, 300 may correspond to the location or position where the viewer's finger contacts (or comes within the proximity of) a touchpad 108 on a remote control 106. The input device 106 transmits or otherwise communicates, to the media device 104, signals indicative of the location or position on the touch-sensing element 108 where input was detected, where the media device 104 and/or the control module 110 analyzes the detected input position signals and correlates the input position on the touch-sensing element 108 to a corresponding location or position on the display 102, 300.

Referring to FIGS. 1 and 3, to input or otherwise select a particular region 360, 370 on the display 300, the viewer may contact the desired region 160, 170 on the touch-sensing element 108 that corresponds to the input region 360, 370 on the display 300 that includes the digit that the viewer would like to input as part of the PIN code. For example, if the viewer would like to input the number 4 as the first digit of the PIN code, the viewer may tap, contact or otherwise manipulate the lower portion 170 of the touch-sensing element 108 to indicate or otherwise select the lower selectable input region 370 on the display 300. As described above, the input device 106 transmits or otherwise communicates, to the media device 104, signals indicative of the location or position on the touch-sensing element 108 where viewer contacts the touch-sensing element 108, and in response to receiving detected input position signals, the media device 104 and/or the control module 110 detects or otherwise identifies selection of the lower selectable input region 370 on the GUI display 300. In alternative embodiments, the viewer may swipe or otherwise motion towards the lower half 170 of the touch-sensing element 108 (e.g., by swiping downward from the upper portion 160 towards the lower portion 170) to indicate or otherwise select the lower selectable input region 370 on the display 300, where the media device 104 and/or the control module 110 detects or otherwise identifies selection of the lower selectable input region 370 on the GUI display 300 based on the detected input position signals indicating a downward motion on the touch-sensing element 108.

Referring again to FIG. 2, in response to identifying selection of an input region on the display device, the authentication process 200 continues verifies or otherwise determines whether a complete sequence of authentication information has been entered (task 208). In this regard, the media device 104 and/or the control module 110 confirms that a complete password, passcode, PIN, or the like has been entered by the viewer, for example, by confirming the number of selected input regions corresponds to the number of characters in the authentication information. When the media device 104 and/or the control module 110 determines that the complete authentication information has not been entered, the authentication process 200 continues by generating or otherwise providing a plurality of updated selectable input regions on the display device, where one of the selectable input regions includes a subsequent portion of the authentication information to be entered by the viewer (task 210). In this regard, the media device 104 and/or the control module 110 dynamically updates or otherwise refreshes the authentication information input GUI display on the display device 102 after a portion of authentication information is entered or selected by the viewer by changing or otherwise updating the contents of the selectable input regions presented on the display device 102. Thereafter, the authentication process 200 repeats the steps of detecting or otherwise identifying selection of an updated selectable input region, determining whether a complete sequence of authentication information has been entered, and generating updated selectable input regions until a complete sequence of authentication information is entered (tasks 206, 208, 210).

After verifying a complete sequence of authentication information has been entered, the authentication process 200 continues by verifying or otherwise determining whether the sequence of selected input regions include or otherwise correspond to the sequential portions of the authentication information before enabling access to the restricted content (tasks 212, 214). In this regard, when a selected input region does not include the appropriate portion of the authentication information for that location of the selected input region within the sequence of selected input regions, the authentication process 200 denies or otherwise disables access to (or presentation of) the restricted content on the display device (task 216). For example, the control module 110 may store or otherwise maintain information identifying the contents of the respective selected input regions and the sequence in which the respective selected input regions were input by the user. When the control module 110 determines the initially selected input region does not include the initial portion of the authentication information, the control module 110 denies or otherwise disables access to (or presentation of) the restricted content on the display device 102, for example, by failing to provide the signals corresponding to a restricted media program from the receiver 114 and/or the DVR 116 to the display interface 118. Conversely, when the initially selected input region includes the initial portion of the authentication information, the control module 110 continues by verifying or otherwise determining whether the second selected input region includes or otherwise corresponds to the second portion of the authentication information. When the second selected input region includes the second portion of the authentication information, the control module 110 continues by verifying or otherwise determining whether the third selected input region includes or otherwise corresponds to the third portion of the authentication information, and so on, until confirming that the entire sequence of selected input regions includes the entirety of the authorized user's authentication information and in the appropriate order.

FIGS. 3-6 depict a sequence of authentication information input GUI displays that may be generated by the media device 104 and/or the control module 110 and presented on the display device 102 in conjunction with the authentication process 200 in accordance with one or more embodiments after identifying selection of the selectable input region 360, 370 of the GUI display 300 that includes the initial digit of the PIN code being used to verify the viewer is an authorized user. In this regard, the sequence of authentication information input GUI displays depicted in FIGS. 3-6 illustrate successful entry of the PIN code 4473.

Figure 4:
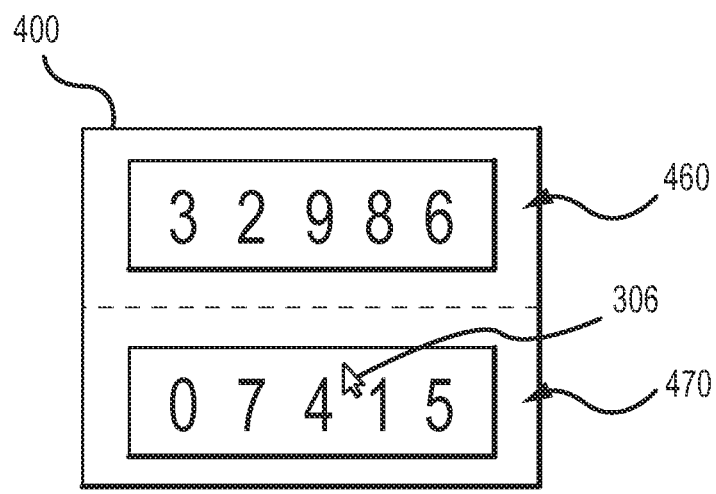

Referring to FIGS. 3-4, the viewer may tap, contact, swipe, select or otherwise manipulate the lower half 170 of the touch-sensing element 108 to move the pointer 306 to the lower region 370 of the GUI display 300 and thereby indicate or otherwise select the lower selectable input region 370 on the GUI display 300. In response to identifying the user-selection of the lower region 370, the media device 104 and/or the control module 110 automatically generates or otherwise provides an updated authentication information input GUI display 400 that includes selectable input regions 460, 470 having updated characters contained therein, where at least one of the selectable input regions 460, 470 includes the subsequent number of the PIN code.

As illustrated, the contents of each of the updated selectable input regions 460, 470 in the updated GUI display 400 is different from the corresponding selectable input regions 360, 370 on the preceding GUI display 300 by at least one character. For example, the media device 104 and/or the control module 110 may randomly reassign or otherwise reallocate each Arabic numeral to one of the input regions 460, 470. In one or more embodiments, the media device 104 and/or the control module 110 verifies or otherwise confirms the updated input regions 460, 470 are mutually exclusive with respect to one another. Additionally, the media device 104 and/or the control module 110 may also verify that each updated input region 460, 470 is different from the preceding input region 360, 370 presented on the corresponding portion of the display device 102 before updating presentation on the display device 102. Thus, the numbers presented in the updated upper selectable input region 460 on the upper portion of the display device 102 are different from the numbers presented in the preceding upper selectable input region 360, the numbers presented in the updated lower selectable input region 470 on the lower portion of the display device 102 are different from the numbers presented in the preceding lower selectable input region 370, and the numbers presented in the updated upper selectable input region 460 and numbers presented in the updated lower selectable input region 370 are mutually exclusive.

Turning now to FIGS. 4-5, the viewer may select or otherwise manipulate the lower half 170 of the touch-sensing element 108 to select the lower input region 470 on the updated GUI display 400. In response to identifying the selection of the lower region 470, the media device 104 and/or the control module 110 determines whether the completed PIN code has been entered. When the entire PIN code has not been entered, the media device 104 and/or the control module 110 automatically generates or otherwise provides another updated authentication information input GUI display 500 that includes updated selectable input regions 560, 570 that differ from the preceding selectable input regions 460, 470, for example, by randomly reassigning or otherwise reallocating the numerical characters. Thereafter, the viewer may tap, contact, swipe, select or otherwise manipulate the upper half 160 of the touch-sensing element 108 to select the upper input region 560 on the updated GUI display 500.

Referring now to FIGS. 5-6, in response to identifying the selection of the upper region 560, the media device 104 and/or the control module 110 automatically generates or otherwise provides another updated authentication information input GUI display 600 that includes updated selectable input regions 660, 670 that differ from the preceding selectable input regions 560, 570. Thereafter, the viewer may select or otherwise manipulate the lower half 170 of the touch-sensing element 108 to select the lower input region 670 on the updated GUI display 600. In response to identifying the selection of the lower region 670, the media device 104 and/or the control module 110 verifies or otherwise confirms that a complete PIN code has been entered (e.g., when the number of selected input regions corresponds to the number of characters of authentication information).

After determining the entire PIN code has been entered by the viewer, the media device 104 and/or the control module 110 verifies or otherwise confirms the sequence of selected input regions corresponds to the sequence of characters for the authorized user's authentication information before enabling access to the restricted content. For example, the media device 104 and/or the control module 110 verifies or otherwise confirms that the first number of the authorized user's PIN code (e.g., '4') was presented within or otherwise associated with the selected input region 370 from the initial input GUI display 300. After determining the initial number of the PIN code is associated with the initial selected input region 370, the media device 104 and/or the control module 110 verifies or otherwise confirms that the second number of the authorized user's PIN code (e.g., '4') was presented within or otherwise associated with the second selected input region 470 from the second input GUI display 400. Thereafter, the media device 104 and/or the control module 110 verifies that the third number of the authorized user's PIN code (e.g., '7') was presented within or otherwise associated with the third selected input region 560 from the third input GUI display 500 and that the fourth number of the authorized user's PIN code (e.g., '3') was presented within or otherwise associated with the fourth selected input region 670 from the fourth input GUI display 600. In this manner, the media device 104 and/or the control module 110 verifies the contents of the sequence of selected input regions match or otherwise correspond to the authentication information before authenticating the user. Thereafter, the media device 104 and/or the control module 110 enables access to the previously restricted content, for example, by providing the signals corresponding to a restricted media program from the receiver 114 and/or the DVR 116 to the display device 102 and/or the display interface 118 for presentation to the viewer on the display device 102.

It should be noted that although the subject matter of FIGS. 2-6 is described in the context of the authentication process 200 verifying the sequence of user inputs corresponds to the authentication information after a complete sequence of authentication information has been entered, in alternative embodiments, the authentication process 200 may verify user input in a piecemeal or sequential manner. For example, in alternative embodiments, in response to identifying selection of an input region (e.g., task 206), the authentication process 200 may confirm the selected input region includes the appropriate portion of authentication information for its sequential location within the authentication information, and thereby, determine that access should be denied before the user has proffered a complete sequence of authentication information. That said, in exemplary embodiments, the authentication process 200 allows the user to input a complete sequence of authentication information before denying access to reduce the likelihood of unauthorized users being able to determine the authentication information by trial and error.

FIG. 7 depicts an exemplary embodiment of a system 700 for placeshifting or otherwise transferring data or content, such as a media program (or media content), from a source electronic device 708 to a destination electronic device 704 over a network 706 for presentation to a user (or viewer) on the destination electronic device 704. For purposes of explanation, but without limitation, the source device 708 may be alternatively referred to herein as a media device or a placeshifting device, and the destination electronic device 704 may be alternatively referred to herein as a playback device or a client device (or client). The placeshifting system 700 also includes a host server 702 (or host) that communicates or otherwise interacts with the devices 704, 708 over the network 706 to facilitate establishment of a peer-to-peer connection 780 over the network 706, which may be utilized for a placeshifting session, as described in greater detail below. As described in greater detail below, the host server 702 may implement the authentication process 200 of FIG. 2 to authenticate the user of the client device 704 for the placeshifting, as described in greater detail below. It should be understood that FIG. 7 is a simplified representation of the placeshifting system 700 for purposes of explanation and is not intended to limit the subject matter described herein in any way.

In practice, the client device 704 may be any device, component, module, hardware and/or the like that is capable of communicating with the host server 702 over network 706. For example, depending on the embodiment, client device 704 may be realized as a conventional personal computer, portable computer, a tablet computer, workstation and/or other computing system, a mobile (or cellular) telephone, a smartphone, a personal digital assistant, a video game player, and/or any other device capable of receiving media programs via the network 706 and presenting audio and/or visual content. In this regard, the client device 704 includes a display device, such as a monitor, screen, or another conventional electronic display, capable of graphically presenting visual content, data and/or information that is generated or otherwise provided by an application 705, 707 executing on the client 704. The client device 704 may further include a user input device, such as a keyboard, a mouse, a touchscreen, or the like, capable of receiving input data and/or other information from the user of the client device 704. The client device 704 also includes a processing system and a data storage element (or memory) that is coupled to or otherwise accessed by the processing system and stores programming instructions that, when read and executed, cause the processing system of the client device 704 to generate one or more applications 705, 707 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 704 may reside at a geographic location that is remote or otherwise physically distinct from the geographic location of the media device 708. In this regard, the media device 708 may have an essentially fixed or permanent geographic location, whereas the geographic location of the client 704 may be transient or otherwise variable with respect to the location of the media device 708. For example, the media device 708 may be realized as a set-top box or a similar device that resides at a user's home for providing media content to the user's television or other home display device 740, while the client 704 is realized as a portable electronic device, such as a mobile phone or other mobile computing device, that moves about with the user.

In the embodiment shown in FIG. 7, client device 704 executes any sort of conventional browser or other client application 705 that is compatible with standard Internet, world wide web (WWW), transmission control protocol and/or internet protocol (TCP/IP), and/or other formats. Such browsers are typically capable of displaying active or other documents formatted in accordance with published protocols (e.g., hypertext markup language (HTML), extensible markup language (XML), and/or the like). Many browsers are also capable of executing "plugin" applications, applets or the like. Such plugins may be formatted in accordance with ActiveX, JAVA and/or any number of other formats. A number of commonly used web browsers are available for a number of different computing platforms, and the subject matter described herein is not limited to any particular browser application. In the illustrated embodiment, client 704 further includes a media player application 707. The media player 707 may be a standalone media player, or the media player 707 may be implemented as a plugin or other applet that runs within the client application 705 as desired. In some embodiments, media player 707 is initially obtained from a networked host, such as host server 702. The media player 707 may be retrieved on an as-needed basis in some embodiments, or may be stored at client 704 for subsequent execution.

Still referring to FIG. 7, in exemplary embodiments, the media device 708 is any device, module, component, hardware and/or the like capable of receiving and processing media content from one or more content sources. For example, in some embodiments, media device 708 is a set-top box (STB) or similar system that is able to receive television programming and/or to record certain programs that can be viewed on a display device 740, such as a television, monitor, liquid crystal display (LCD), light emitting diode (LED) display, plasma display, or the like. Exemplary embodiments of media device 708 will therefore include or otherwise be coupled to a receiver interface 742 for receiving satellite, cable and/or broadcast programming signals from broadcast sources 712, as well as a data storage medium 710 (e.g., a hard disk, flash memory, or another suitable non-volatile data storage element) to support a digital video recorder (DVR) feature and/or functionality, a display interface 744 for providing imagery to the display device 740, and a control module 746 that directs the operations of the media device 708 as appropriate. For convenience, but without limitation, the data storage medium 710 is alternatively referred to herein as a DVR. Media device 708 may also include one or more interfaces 748 to the network 706 and/or an input/output interface 750 to a remote control or other device for providing user inputs to the media device 708, such as input device 106. The network interface(s) 748 of the media device 708 may include an interface or port for a wired communications layer (e.g., an Ethernet port or adapter), an interface for a wireless communications layer (e.g., an IEEE 802.11-compatible transceiver), and/or the like.

The components in media device 708 may be provided within a common chassis or housing as depicted in FIG. 7, although equivalent embodiments may implement media device 708 with any number of inter-connected but discrete components or systems. For example, in some embodiments, the media device 708 may be realized as a combination of a STB and a placeshifting device, wherein some features of the media device 708 (e.g., the DVR 710, the receiver 742, the display interface 744, and/or I/Os 750) are implemented by the STB and other features of the media device 708 (e.g., the network interface 748) are implemented by the placeshifting device, wherein the placeshifting device works in conjunction with the STB to shift the viewing experience from a home television (e.g., display device 740) to a viewing display on the client device 704 that is accessed via the network 706. Examples of placeshifting devices that may be used in some embodiments of media device 708 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 708 may be a hybrid DVR and/or receiver, for example, that also provides transcoding and placeshifting features. It should be appreciated that FIG. 7 depicts merely one exemplary embodiment of a media device 708, and in practice, the media device 708 may be logically and physically implemented in any manner to suit the needs of a particular embodiment.

In the exemplary embodiment illustrated in FIG. 7, media device 708 is capable of receiving digital broadcast satellite (DBS) signals transmitted from a broadcast source 712, such as a satellite, using an antenna 752 that provides received signals to the receiver 742. Equivalent embodiments, however, could receive programming at receiver 742 from any sort of cable connection, broadcast source, removable media, network service, external device and/or the like. In some embodiments, the media device 708 may also include an access card interface or card reader 754 adapted to receive an access card 760 (or viewing card) configured to ensure that the viewer is authorized to view media content provided to the display device 740. In this regard, the access card 760 includes unique identification information associated with a particular subscriber to the broadcast content source 712 or otherwise includes subscription information that facilitates receiving and/or decoding media content provided by the broadcast content source 712.

The DVR 710 feature stores recorded programming (e.g., recorded broadcast programming received via receiver 742) on a hard disk drive, memory, a networked server, or other storage medium as appropriate in response to user/viewer programming instructions, wherein the recorded programming may be subsequently viewed via the media device 708, either on display device 740 or client device 704 via network 706. Content stored in DVR 710 may be any sort of file-based programming or other content that is accessible to media device 708. In various embodiments, in addition to storing broadcast programming, the DVR 710 may also store programming received from other sources not illustrated in FIG. 7, such as, for example, programming downloaded from an on-demand programming source or an online programming source. Additionally, content in DVR 710 may be stored in any sort of compressed or uncompressed format, as desired, and may be encoded or transcoded as desired for effective receipt, storage, retrieval and playing.

The control module 746 is any sort of hardware, circuitry, processing logic and/or other components capable of directing the operations of media device 708. In various embodiments, control module 746 includes software or firmware logic and/or other programming instructions residing in memory and executing on any sort of processing system, such as any sort of processor, microprocessor, microcontroller, digital signal processor or the like. The instructions, when read and executed, cause the control module 746 to perform various tasks, functions, processes and/or operations and otherwise support the subject matter described herein. In various embodiments, the control module 746 is based upon a "system on a chip" (SoC) implementation that incorporates a hybrid microcontroller with memory, input/output and other features to perform the various signal processing and other actions of media device 708. Other embodiments may implement control module 746 and/or the other features of media device 708 with any number of discrete and/or integrated processing components (e.g., any sort of microprocessor or microcontroller), memories, input/output features and/or other features as desired. The control module 746 communicates with the network interface 748 to establish a peer-to-peer connection 780 to the client device 704 over the network 706 and support streaming of media programs (e.g., from the DVR 710 or the receiver 742) to the client device 704 over the network 706 via the peer-to-peer connection 780, as described in greater detail below.

In the embodiment of FIG. 7, the network 706 is any communications network (or a combination of communications networks) capable of transmitting data between devices within the system 700. In various embodiments, network 706 includes any number of public or private data connections, links or networks supporting any number of communications protocols. Network 706 may include the Internet, for example, or any other network. Such networks may be based upon TCP/IP or other conventional protocols, although other embodiments may use any type of alternate or successor protocols, as desired. In various embodiments, network 706 may also incorporate a wireless and/or wired telephone network, such as a cellular communications network for communicating with mobile phones, personal digital assistants, and/or the like. Various embodiments of network 706 may also incorporate any sort of wireless or wired local area networks (LANs), wide area networks (WAN), or the like.

In the illustrated embodiment of FIG. 7, the host server 702 may be realized as one or more server computers or other device(s) coupled to the network 706 and capable of interacting with the devices 704, 708 to facilitate communications between the client device 704 and the media device 708 associated with the user or operator of the client 704. The host server 702 may be implemented with a server computer system or data processing system that is based upon any processor, architecture and/or operating system, and will typically be implemented using any sort of processing system 730, memory 732 and input/output features 734. Various embodiments may be implemented using dedicated or shared hardware servers; other implementations may make use of virtual server features as part of a "cloud computing" service, such as any of the cloud computing services provided by any number of providers. Although FIG. 7 shows a single server 702 for convenience, many practical embodiments of the system 700 may provide a cluster or other collection of multiple host servers 702 to support any desired number of simultaneous communications with multiple clients 704 and/or multiple media devices 708. This cluster may also incorporate appropriate routing, load balancing, access and security mechanisms and/or any number of other features. In various embodiments, each host server 702 is an actual or virtual computer system executing an operating system 736 in conjunction with the processing system 730, memory 732 and/or I/O features 734 to provide a computing core that is capable of executing a portal application 738, as well as any number of daemons, processes, applications or other modules as desired. For example, a portal application 738 could execute as a daemon on the host server 702, with connections to separate clients 704 being managed as separate processes or instances that communicate with portal application 738 using features provided by operating system 736. In one or more embodiments, the memory 732 stores programming instructions that, when read and executed, cause the processing system 730 to create, generate, or otherwise facilitate the portal application 738 and perform various tasks, functions, processes and/or operations described herein. In this regard, the memory 732 represents any non-transitory short or long term data storage element or other computer-readable media capable of storing programming instructions for execution by or on the processing system 730.

The user of the client 704 is able to connect to the portal application 738 supported by host 702 via the network 706, for example, by directing the client application 705 to a URL or other network address associated with host 702 and/or portal application 738. In exemplary embodiments, after the user is successfully authenticated by the portal application 738, the host 702 and/or portal application 738 establishes a connection 770 over the network 706 to the media device 708 that is associated with the user. Thereafter, the host 702 and/or the portal application 738 utilizes the connection 770 to obtain, from the media device 708 via the network 706, information about programming stored at the media device 708 and available for placeshifting to the client device 704, such as, for example, a listing of the media programs stored on DVR 710.

In one or more exemplary embodiments, the host server 702 is coupled to an electronic program guide 722, which may be realized as a server, a database, or another device operating on the network 706 that maintains information pertaining to current and/or future broadcasts (or airings) of media programs that are available to be received from broadcast source 712 (e.g., by the media device 708 via receiver 742 and/or antenna 752). The host server 702 and/or the portal application 738 may obtain information pertaining to current and/or future broadcasts (or airings) of media programs from the electronic program guide 722 and generate or otherwise provide a program guide graphical user interface (GUI) display on the client device 704 (e.g., within client application 705) that indicates media programs that are or will be available for streaming from the media device 708. The user of the client device 704 may manipulate or otherwise utilize the graphical user interface (or the graphical user interface elements contained therein) to select or otherwise identify media programs for streaming to the client device 704 and/or recording to the DVR 710.

In the illustrated embodiment of FIG. 7, the placeshifting system 700 also includes a media program database 724 that includes verified or validated metadata and/or other descriptive information for a vast array of media programs. For example, the media program database 724 may contain metadata and/or other descriptive information pertaining to substantially all of the media programs that may be available from one or more content sources within placeshifting system 700 (e.g., information pertaining to any media programs that have previously been aired by a broadcast source 712, along information pertaining to any movie that has been presented in theaters, made available on-demand, or released for individual use (e.g., on digital video disc (DVD) or the like)). In exemplary embodiments, for each media program having a record (or entry) in the media program database 724, the media program database 724 maintains a media data object that includes one or more fields of metadata associated with that media program along with one or more fields of program identifiers that may be used to identify that media program record. In this regard, the program guide 722 and the media program database 724 may utilize the same program identifiers to uniquely identify each media program.

Referring to FIG. 7 with reference to FIG. 2, in one or more exemplary embodiments, the host server 702 and/or the portal application 738 implements or otherwise performs the authentication process 200 of FIG. 2 to authenticate the user of the client device 704 is an authorized user associated with the media device 708 before presenting content associated with the media device 708 within the client application 705 or otherwise allowing access to the media device 708 for placeshifting. For example, the user may manipulate the client application 705 to contact or otherwise access the portal application 738 via the network 706 and attempt to login to the portal application 738. The portal application 738 may receive or otherwise obtain a user identifier (or subscriber identifier) associated with the client device 704 and identify authentication information corresponding to that user identifier. For example, the user of the client device 704 may input or otherwise provide a username that the user has previously registered with the host server 702 and/or the portal application 738, where the authentication information is realized as a password associated with that username that was set by a subscriber associated with the media device 708 when registering with the portal application 738 and stored or otherwise maintained on the host server 702. In other embodiments, the authentication information may be stored on the media device 708 and/or the access card 760 and retrieved by the host server 702 and/or the portal application 738 via the connection 770 over the network 706.

After obtaining the authentication information associated with the user identifier and/or the media device 708, the host server 702 and/or the portal application 738 performs the authentication process 200 by presenting or otherwise providing a plurality of randomized selectable input regions within the client application 705 on the client device 704, where at least one of the input regions includes an initial portion of the authentication information. As described above, the user may manipulate the user input device associated with the client device 704 to select an input region presented on the client device 704. In response to receiving selection of an input region presented within the client application 705, the host server 702 and/or the portal application 738 presents or otherwise provides an updated plurality of randomized selectable input regions within the client application 705 on the client device 704, where at least one of the updated input regions includes a subsequent portion of the authentication information, and so on, until a complete sequence of proffered authentication information has been entered by the user of the client device 704.

After the user enters the a complete sequence of the authentication information and is successfully authenticated by the portal application 738, the host 702 and/or portal application 738 may establish the connection 770 over the network 706 to the media device 708 and utilize the connection 770 to obtain, from the media device 708 via the network 706, information about programming stored at the media device 708 and available for placeshifting to the client device 704, such as, for example, a listing of the media programs stored on DVR 710. Thereafter, the host 702 and/or portal application 738 may present a GUI display on the client device 704 (e.g., within the client application 705) that includes a listing of media programs recorded on the DVR 710 and allows the user of the client device 704 to select a recorded media program for placeshifting from the media device 708 to the client device 704. Conversely, when the host server 702 and/or the portal application 738 determines the selected input region does not include the appropriate portion of the authentication information, the host server 702 and/or the portal application 738 may disable access to restricted content. For example, in lieu of presenting a GUI display within the client application 705 that includes a listing of media programs recorded on the DVR 710, the host server 702 and/or the portal application 738 may present a GUI display that indicates that the media device 708 cannot be accessed by the user. It should be noted that although FIG. 7 depicts the network connection 770 as being between the host 702 and the media device 708, in practice, the placeshifting system 700 may include one or more intermediary components (e.g., one or more message servers) configured to establish, facilitate, or otherwise support the connection 770.

In some embodiments, the host server 702 and/or the portal application 738 may also implement or otherwise perform the authentication process 200 of FIG. 2 before placeshifting a media program from the media device 708 to the client device 704. For example, the user may select or otherwise indicate a desire to placeshift a broadcast media program available via the broadcast content source 712 or a recorded media program on the DVR 710 that is subject to access controls (e.g., pay-per-view broadcast programming, a broadcast or recorded media program with a particular parental guidance rating, or the like). In this regard, the access controls and related content restriction information may be stored or otherwise maintained by the host 702 in association with the media device 708 (e.g., in association with subscriber information associated with the media device 708 and/or the access card 760). In some embodiments, the host server 702 and/or the portal application 738 may implement or otherwise perform the authentication process 200 when the user attempts to placeshift restricted media content in addition to performing the authentication process 200 when the user initially attempts to login to the portal application 738. Additionally, the host server 702 and/or the portal application 738 may implement or otherwise perform the authentication process 200 whenever an attempt to schedule a recording of restricted content to the DVR 710 is received.

After performing the authentication process 200 and successfully authenticating the user of the client 704 in response to receiving a placeshifting request for a restricted media program from the client 704, the host 702 and/or the portal application 738 transmits or otherwise provides streaming instructions for the restricted media program to the media device 708 over the network 706 (e.g., via connection 770). In this regard, the streaming instructions identify the client device 704 as the destination device for the placeshifting session along with the requested media program for the placeshifting session. In response to the streaming instructions, the media device 708 automatically initiates the peer-to-peer connection 780 over the network 706 with the client 704. After communicating with the client device 704 to establish the peer-to-peer connection 780, the media device 708 automatically transfers or streams the restricted media program to the media player 707 within the client application 705 on the client 704.

In yet another embodiment, the media device 708 implements or otherwise performs the authentication process 200 of FIG. 2 to authenticate the user of the client device 704 before placeshifting content to the client 704. For example, in response to receiving a placeshifting request for a media program from the client 704, the host 702 and/or the portal application 738 transmits or otherwise provides streaming instructions for the media program to the media device 708. Thereafter, the media device 708 may determine whether the requested media program is restricted based on the access control information stored by the media device 708. When the media device 708 determines a restricted media program is requested for placeshifting, the media device 708 performs the authentication process 200 to verify or otherwise confirm the user of the client 704 is authorized for the requested media program. In some embodiments, the streaming instructions received from the host 702 and/or portal application 738 may include the user identifier input by the user of the client 704 to login to the portal application 738, which, in turn may be utilized by the media device 708 to obtain the corresponding authentication information for that user. In other embodiments, the media device 708 may generate or otherwise provide a GUI display within the client application 705 (e.g., via connection 780 established using destination device identification information from the streaming instructions) for receiving a user identifier from the user of the client 704. In a similar manner as described above in the context of FIGS. 2-6, the media device 708 generates or otherwise provides a sequence of randomized selectable input regions within the client application 705 for receiving input authentication information from the client 704. After authenticating the user of the client 704 as an authorized user for the restricted media program selected for placeshifting, the media device 708 automatically transfers or streams the restricted media program to the media player 707 within the client application 705 on the client 704.

To briefly summarize, by virtue of the subject matter described herein, a user may enter his or her personal authentication information in a manner that utilizes a display that may be viewable by other individuals which the user would like to prevent from learning or stealing the authentication information. For example, if a parent is trying to bypass parental controls using a remote control (e.g., input device 106) in conjunction with a GUI display presented on a home television (e.g., display device 102) in the presence of children, the children are likely to be unable to discern the authentication information by virtue of the parent selecting randomized input regions that include random characters in addition to the characters that the parent actually intends to enter. By obscuring the authentication information being entered on the television, the remote control can incorporate a touchpad, directional pad, or the like for entering the authentication information without the need for a touchscreen, a display, labeled keys, or the like on the remote control that allows the user to identify the authentication information being entered.

Additionally, if a user is trying to login to a website (e.g., the host server 702 and/or portal application 738) in a public location, other nearby individuals are likely to be unable to discern the user's authentication information, thereby preventing other individuals from stealing the user's authentication information. Thus, if the user is on a tablet computer (e.g., client 704) that includes only a touchscreen user interface in a public location, the user may be able to enter authentication information by tapping, swiping, manipulating, or otherwise selecting randomized input regions on the touchscreen without an observer being able to ascertain the authentication information being input.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to placeshifting, streaming media, networking, GUI displays, access controls, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of hardware, software, and/or firmware components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of authenticating a user for access to restricted content, the method comprising:
   providing a plurality of selectable regions on a display, a first region of the plurality of selectable regions including a first portion of authentication information, each selectable region of the plurality of selectable regions including a plurality of characters and each selectable region of the plurality of selectable regions corresponding to a respective region of an input device manipulable by the user, wherein a remote control associated with a media device includes the input device;
   receiving, by the media device from the remote control, a first user input corresponding to the first region by correlating a first detected input position from the input device to the first region;
   in response to identifying the first user input, providing a plurality of updated selectable regions on a display, each updated selectable region of the plurality of updated selectable regions including a plurality of characters and each updated selectable region of the plurality of updated selectable regions corresponding to a respective region of the input device, a second region of the plurality of updated selectable regions including a subsequent portion of authentication information;

receiving, by the media device from the remote control, a second user input corresponding to the second region by correlating a second detected input position from the input device to the second region;

authenticating the user based at least in part on the first user input corresponding to the first region that includes the first portion of authentication information and the second user input corresponding to the second region that includes the subsequent portion of the authentication information; and after authenticating the user, providing, by the media device, the restricted content for presentation on the display from one of a receiver of a media device or data storage of the media device.

2. The method of claim 1, wherein providing the plurality of selectable regions comprises:

generating the first region on a first portion of the display, the first region including a first plurality of characters; and generating the second region on a second portion of the display, the second region including a second plurality of characters.

3. The method of claim 2, wherein the first portion and the second portion of the display are mutually exclusive.

4. The method of claim 1, wherein providing the plurality of selectable regions comprises:

generating the first region on the display, the first region including a first set of random characters; and generating the second region on the display, the second region including a second set of random characters.

5. The method of claim 4, wherein the first set and the second set are mutually exclusive.

6. The method of claim 4, wherein:

generating the first region comprises randomly selecting a first set of characters for presentation on a first portion of the display; and generating the second region comprises randomly selecting a second set of characters for presentation on a second portion of the display.

7. The method of claim 6, wherein the first portion and the second portion of the display are mutually exclusive.

8. The method of claim 6, the authentication information comprising a numerical code, wherein:

randomly selecting the first set comprises randomly allocating a first subset of numerical digits to the first portion of the display; and randomly selecting the second set comprises allocating a remaining subset of numerical digits to the second portion of the display.

9. The method of claim 6, the authentication information comprising an alphanumeric password, the portion of the authentication information comprising a first alphanumeric character, wherein:

randomly selecting the first set comprises:

allocating the first alphanumeric character to the first portion of the display;

randomly selecting one or more additional alphanumeric characters for presentation within the first portion of the display; and randomly selecting the second set comprises randomly selecting a plurality of alphanumeric characters for presentation within the second portion of the display.

10. A media device comprising:

a first interface to receive input from a user via a remote control associated with the media device, the remote control including an input device;

a second interface to a display device;

a receiver;

data storage; and a control module coupled to the first interface and the second interface to:

authenticate the user based at least in part on a first input from the remote control corresponding to a first selectable input region of a plurality of selectable input regions presented on the display device and a second input from the remote control corresponding to a second selectable input region of a plurality of updated selectable regions presented on the display device; and provide restricted content from one of the receiver and the data storage to the second interface for presentation on the display device after authenticating the user, wherein:

the first selectable input region includes a first portion of authentication information associated with an authorized user;

the second selectable input region includes a subsequent portion of the authentication information;

each selectable input region of the plurality of selectable input regions includes a plurality of characters;

each selectable input region corresponds to a respective region of the input device manipulable by the user;

each updated selectable input region of the plurality of updated selectable input regions includes a plurality of characters; and each updated selectable input region corresponds to a respective region of the input device manipulable by the user.

11. The media device of claim 10, wherein each selectable input region of the plurality of selectable input regions comprises a respective portion of the display device including a unique set of characters.

12. The media device of claim 10, wherein the plurality of selectable input regions are mutually exclusive.

13. The media device of claim 10, wherein:

the input device includes a touch-sensing element; and each selectable input region of the plurality of selectable input regions comprises a portion of the display device that corresponds to a respective portion of the touch-sensing element.

14. The media device of claim 10, wherein the plurality of characters of one or more of the plurality of selectable input regions is randomized.

15. A system comprising:

a media device coupled to a network, the media device including a receiver and data storage; and a server coupled to the network to provide a plurality of selectable input regions to a client device, authenticate a user of the client device based at least in part on first and second user inputs received from the client device, and provide streaming instructions for a restricted media program to the media device after authenticating the user, the media device streaming the restricted media program from one of the receiver and the data storage to the client device via the network in response to the streaming instructions, wherein:
the first user input corresponds to a first selectable input region of the plurality of selectable input regions that includes a portion of authentication information associated with an authorized user;
the second user input corresponds to a second selectable input region of a plurality of updated selectable input regions provided to the client device that includes a subsequent portion of the authentication information;
each selectable input region of the plurality of selectable input regions includes a plurality of characters;
each selectable input region of the plurality of selectable input regions corresponds to a respective region of an input device of the client device;
each updated selectable input region of the plurality of updated selectable input regions includes a plurality of characters; and
each updated selectable input region corresponds to a respective region of the input device of the client device.

16. The method of claim 1, wherein:
the input device comprises a touch-sensing element;
the first region corresponds to a first half of the touch-sensing element; and
the second region corresponds to a second half of the touch-sensing element.

17. The method of claim 16, wherein:
the first region comprises an upper region of the display corresponding to an upper half of the touch-sensing element; and
the second region comprises a lower region of the display corresponding to a lower half of the touch-sensing element.

* * * * *